United States Patent [19]

Horii et al.

[11] Patent Number: 5,050,003
[45] Date of Patent: Sep. 17, 1991

[54] IMAGE PROCESSING APPARATUS CAPABLE OF DISPLAYING A PLURALITY OF SCREENS

[75] Inventors: Hiroyuki Horii; Yoichi Yamagishi, both of Kawasaki; Hiroyoshi Misumi, Yokohama; Makoto Takayama, Kawasaki, all of Japan

[73] Assignee: Canon Kabushiki Kaisha, Tokyo, Japan

[21] Appl. No.: 609,077

[22] Filed: Nov. 7, 1990

Related U.S. Application Data

[63] Continuation of Ser. No. 230,042, Aug. 9, 1988, abandoned.

[30] Foreign Application Priority Data

Aug. 11, 1987 [JP] Japan ................................ 62-200670
Aug. 12, 1987 [JP] Japan ................................ 62-201556
Aug. 12, 1987 [JP] Japan ................................ 62-201557
Sep. 3, 1987 [JP] Japan ................................ 62-221150
Sep. 3, 1987 [JP] Japan ................................ 62-221151

[51] Int. Cl.$^5$ .......................................... H04N 5/781
[52] U.S. Cl. .................................... 358/342; 358/906
[58] Field of Search ................ 360/33.1, 35.1, 14.1, 360/14.2, 14.3; 358/310, 311, 335, 342, 906, 909, 22, 108

[56] References Cited

U.S. PATENT DOCUMENTS

| 4,763,208 | 8/1968 | Kawamura et al. | ............... 360/33.1 |
| 4,802,018 | 1/1989 | Tanikawa et al. | ................ 358/335 |
| 4,802,019 | 1/1989 | Harada et al. | ..................... 360/33.1 |
| 4,805,039 | 2/1989 | Otake et al. | ........................ 358/335 |

Primary Examiner—Donald McElheny, Jr.
Attorney, Agent, or Firm—Fitzpatrick, Cella, Harper & Scinto

[57] ABSTRACT

An image processing apparatus includes a reproducing device for reproducing recorded image data from a medium on which a plurality of image data are recorded. Apparatus is provided for supplying to a monitor the reproduced image data as a multi-screen wherein one screen of the monitor displays a plurality of smaller screens each corresponding to a respective one of the plurality of image data. Structure is provided for designating at least one of the smaller screens displayed on the multi-screen, and circuitry is provided for erasing from the medium image data corresponding to one of the smaller screens designated by the designating structure.

25 Claims, 10 Drawing Sheets

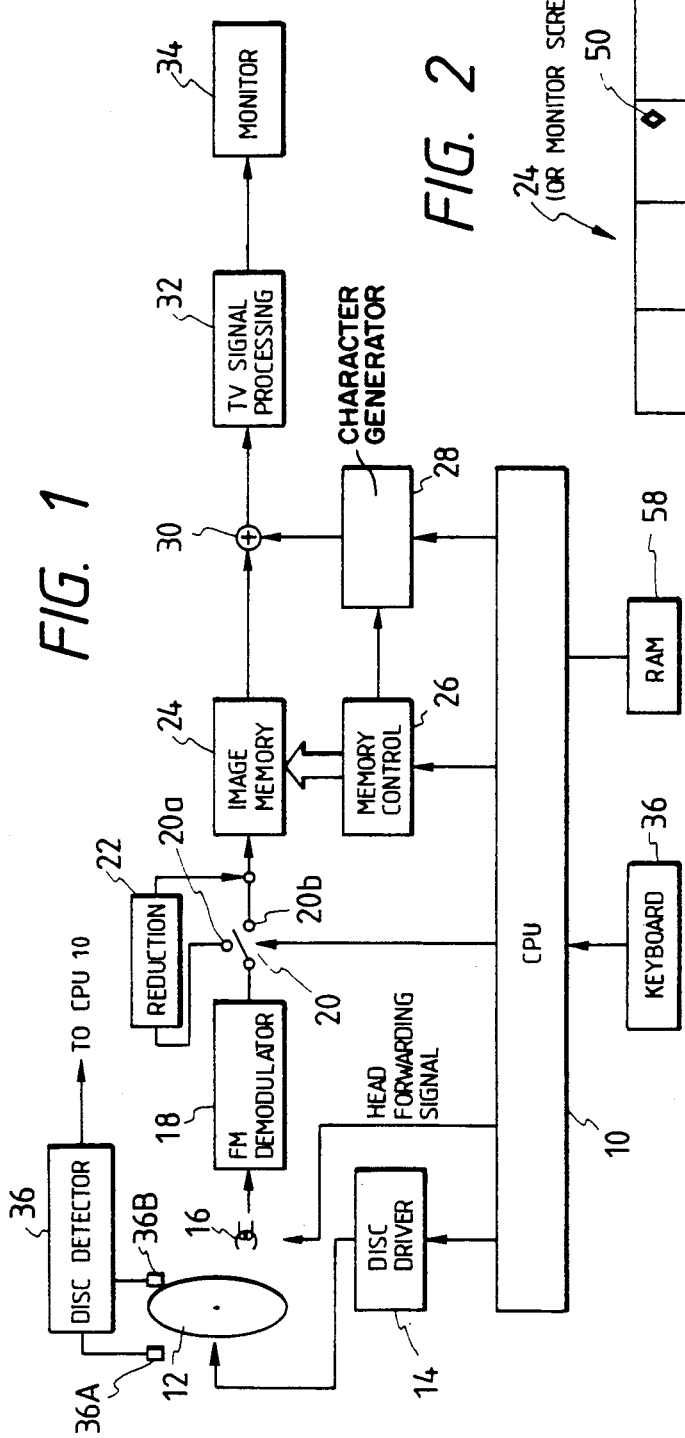

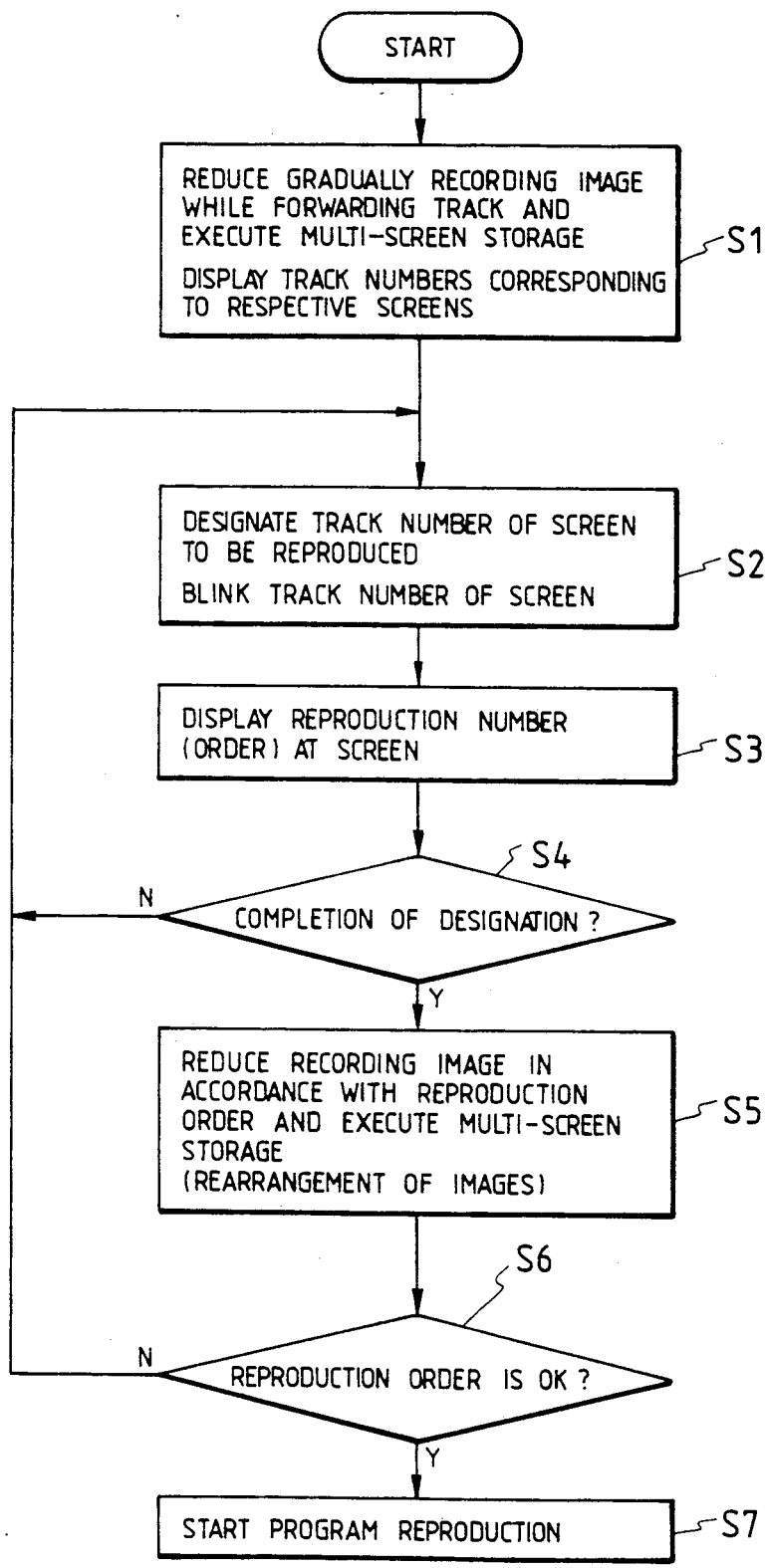

FIG. 7A
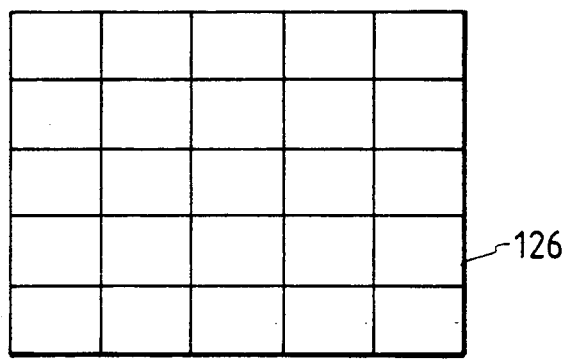
FIG. 7B
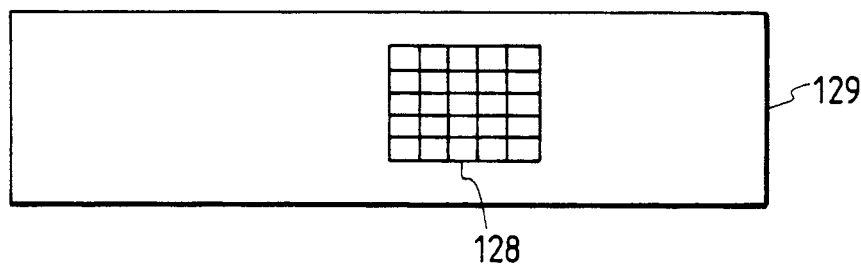
FIG. 9
| FIRST FIELD | | | | | | SECOND FIELD | | | | |
|---|---|---|---|---|---|---|---|---|---|---|
| 1 | 2 | 3 | 4 | 5 | | 26 | 27 | 28 | 29 | 30 |
| 6 | 7 | 8 | 9 | 10 | | 31 | 32 | 33 | 34 | 35 |
| 11 | 12 | 13 | 14 | 15 | | 36 | 37 | 38 | 39 | 40 |
| 16 | 17 | 18 | 19 | 20 | | 41 | 42 | 43 | 44 | 45 |
| 21 | 22 | 23 | 24 | 25 | | 46 | 47 | 48 | 49 | 50 |
IMAGE MEMORY

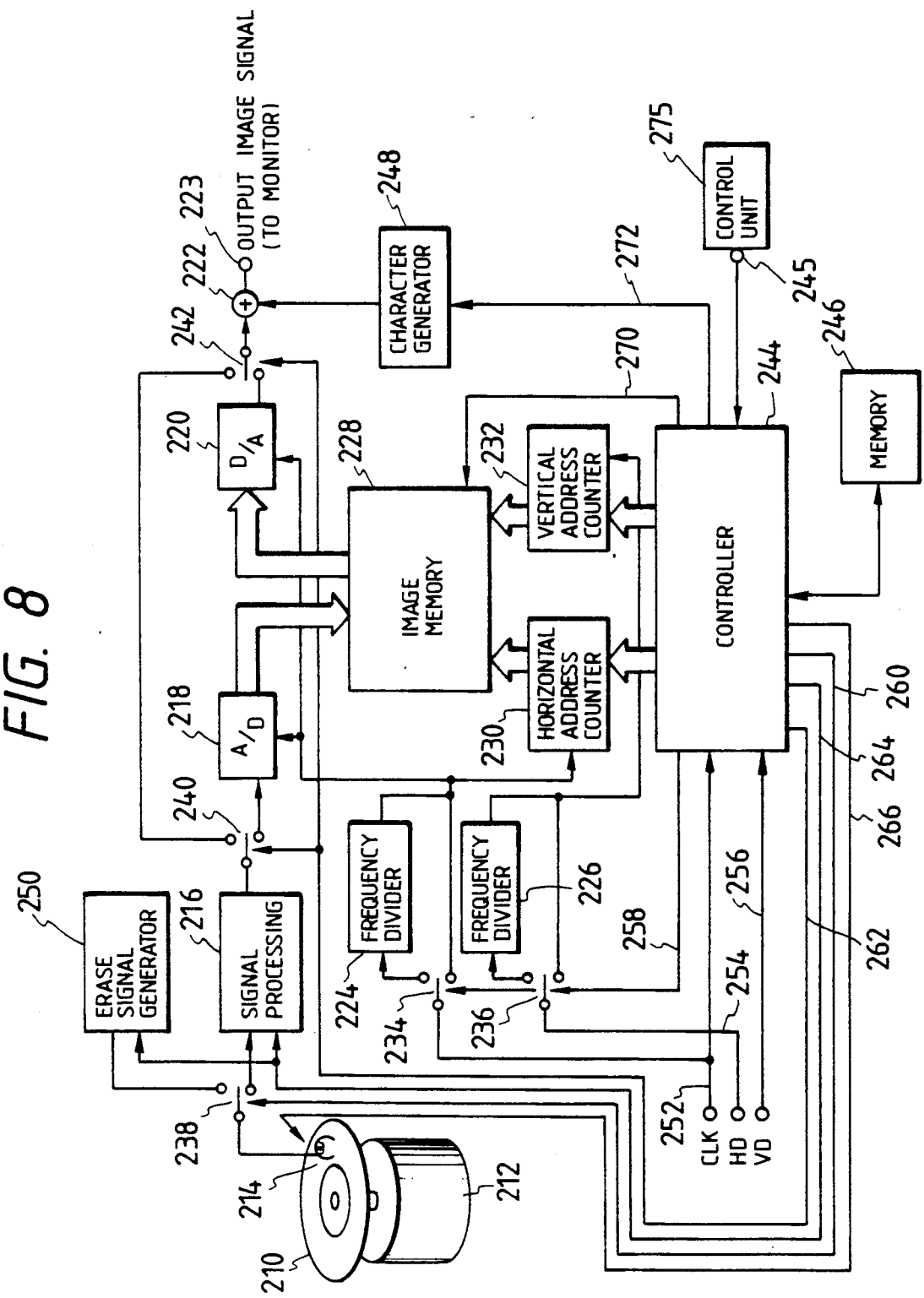

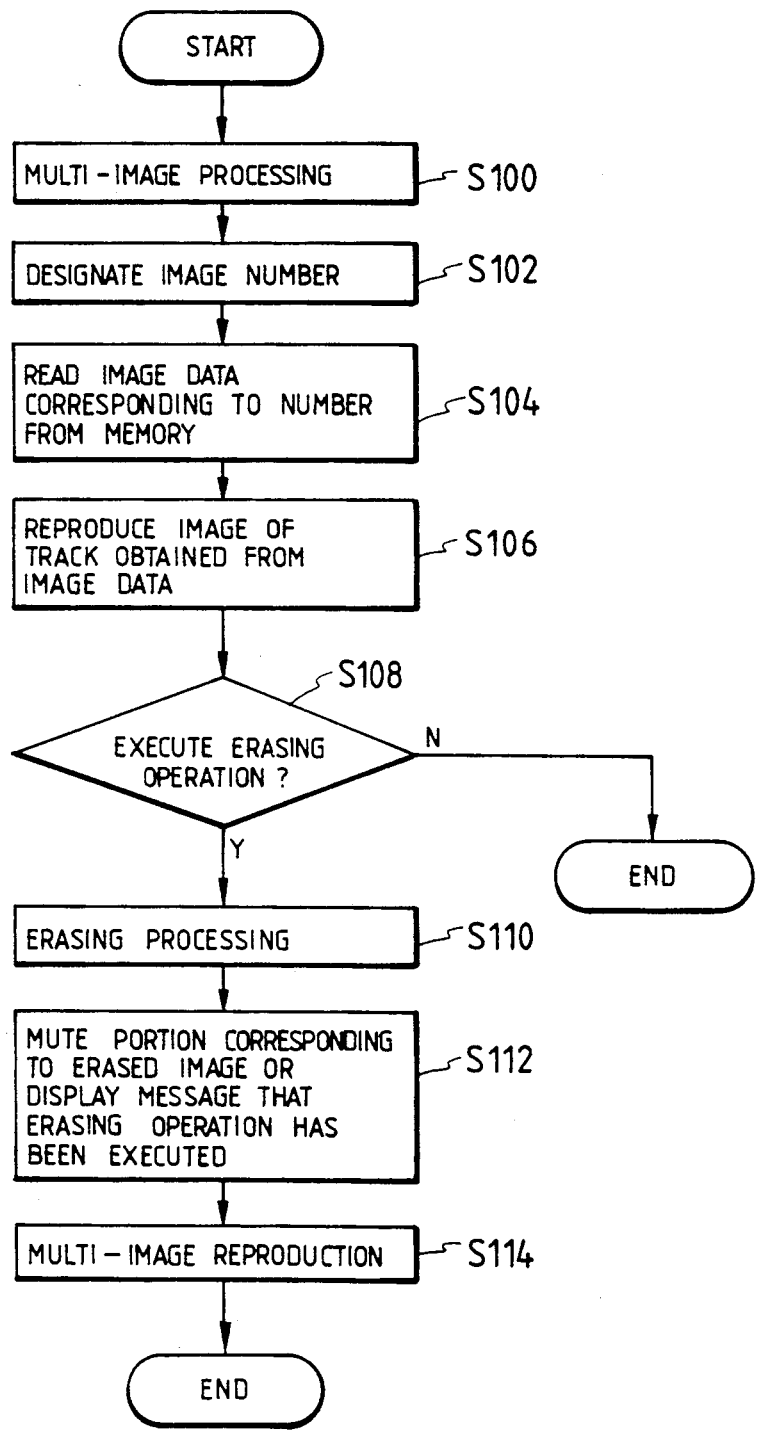

IMAGE PROCESSING APPARATUS CAPABLE OF DISPLAYING A PLURALITY OF SCREENS

This application is a continuation of prior application Ser. No. 07/230,042, filed Aug. 9, 1988, now abandoned.

BACKGROUND OF THE INVENTION

1. Field of the Invention

The present invention relates to an image processing apparatus and, more particularly, to an image processing apparatus which is able to reproduce image information from a medium.

2. Related Background Art

Hitherto, in a still video recording/reproducing system, to search for a desired image from among a plurality of images recorded on a magnetic sheet, it is necessary to perform a procedure such that the recorded image on each track was reproduced and displayed while forwardly feeding a reproducing head by one track, so that it takes a long time. On the other hand, there has also been proposed a searching system such that the reproducing head are forcibly moved to the track of a desired track number and the recorded image on this track was reproduced and displayed. However, in this case, it was necessary to provide means for recording or storing the corresponding relation between the track number and the image recorded on this track, so that the structure of the apparatus was complicated and expensive.

SUMMARY OF THE INVENTION

In consideration of the foregoing drawbacks in the conventional apparatus, it is a first object of the present invention to provide an image processing apparatus which can promptly process desired image information from a medium on which a plurality of image information are recorded.

Under such an object, the invention intends to provide an image processing apparatus which can promptly reproduce desired image information from a medium on which a plurality of image information are recorded.

Under the first object, the invention intends to provide an image processing apparatus which can promptly erase desired image information from a medium on which a plurality of image information are recorded.

According to a preferred embodiment of the invention, there is provided a reproducing apparatus for reproducing a recorded image from a recording medium on which image information are recorded, this apparatus comprises: supplying means for simultaneously supplying to a monitor a plurality of images recorded on the recording medium; setting means for setting a program of a procedure to reproduce a plurality of images in a state in which a plurality of images are reproduced by the supplying means; and means for displaying the setting state of the setting means, wherein the plurality of recorded images on the recording medium can be simultaneously confirmed (or confirmed in a small number of steps such as two or three) by the supplying means, and the recorded image to be observed can be easily found. In addition, the program reproducing order can be visually confirmed by the setting means and display means, so that the reproducing order of a plurality of images can be easily set in a short time.

Another object of the invention is to provide a reproducing apparatus which can simultaneously and visually observe a plurality of images when reproducing image information recorded on a medium.

The above and other objects and features of the present invention will become apparent from the following detailed description and the appended claims with reference to the accompanying drawings.

BRIEF DESCRIPTION OF THE DRAWINGS

FIG. 1 is a constitutional block diagram of the first embodiment of the invention;

FIG. 2 is a diagram showing an enclosing state of reproducing images in a confirmation mode or of images into an image memory;

FIG. 3 is an operating flowchart for performing the program reproduction;

FIGS. 7A and 7B are diagrams showing a multi-screen display and an arrangement of a selecting apparatus 128;

FIG. 8 is a block diagram of a third embodiment of the invention;

FIG. 9 is a diagram showing an example of the display of a multi-screen and the storage thereof in an image memory 228 in FIG. 8;

FIG. 10 is a flowchart for the erasing operation;

DETAILED DESCRIPTION OF THE PREFERRED EMBODIMENTS

Figure 4:
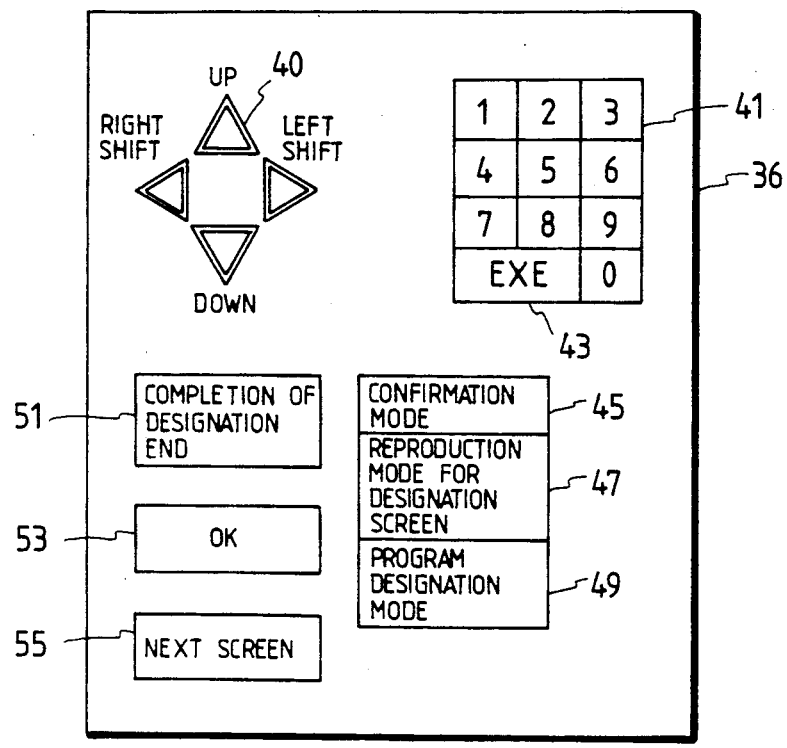
FIG. 4 is an example of a keyboard.

FIG. 1 shows a schematic block diagram of an embodiment of the present invention.

In FIG. 1, reference numeral 10 denotes a CPU for controlling each section in the apparatus shown in the diagram. The CPU 10 has: a confirmation mode for reducing a plurality of images recorded on a disc 12 and for simultaneously monitoring and displaying them; and a designated image reproduction mode for reproducing the image on a designated track and for monitoring and displaying this image. The designated image reproduction mode is further divided into a manual mode for field reproducing or frame reproducing the image of the track number which is designated by an operator and a program mode for reproducing and displaying the images of a series of track numbers in accordance with the designated order. In this embodiment, a method of program setting in this confirmation mode will be mainly explained.

Reference numeral 12 denotes a still video floppy. Twenty-five frame images are recorded on fifty tracks. A disc driver 14 rotates the disc 12 at a predetermined speed under control of the CPU 10. A reproducing head 16 reproduces a video signal on a designated track of the disc 12 in accordance with a head forwarding signal from the CPU 10. A frequency demodulator 18 frequency demodulates a signal from the reproducing head 16 and forms a reproduction image signal. When the confirmation mode is set by the operation of a keyboard 36, a switch 20 is connected to a contact 20a by the CPU 10. An output of a frequency demodulator 18 is applied to a reduction circuit 22 through the switch 20. In the case of the embodiment shown in the diagram, the reduction circuit 22 reduces the reproduced image into 1/5 in the vertical and lateral directions (therefore, into 1/25 as an area). For instance, this reduction is performed by a thinning-out method or a time base compressing method.

An image memory 24 has a memory capacity as much as one field. A memory control circuit 26 controls the operation of the image memory 24 and addresses in this memory under the control of the CPU 10. In this embodiment, in the confirmation mode, the CPU 10 sequentially reproduces recorded signals on the odd-number tracks of the disc 12. Since the reduction circuit 22 reduces each reproduced image into 1/25, the twenty-five reduced images can be stored in the image memory 24. FIG. 2 is a diagram schematically showing enclosing positions when the 25 reduced images are stored in the image memory 24. FIG. 2 is a diagram showing an arrangement of images on the screen which are reproduced on the monitor 34. The memory control circuit 26 controls the addresses in the image memory 24 such that the 25 field image signals reduced by the reduction circuit 22 are stored in the image memory 24 as shown in FIG. 2.

The image memory 24 digitally stores the image data. Since the A/D conversion and D/A conversion for this digital storing operation are not concerned with the essence of the invention, their circuits are not shown in the diagram and their descriptions are omitted.

Track numbers are also simultaneously displayed on a reproducing monitor screen in order to show on which track each image is recorded. A character generator 28 is provided for this purpose. A character pattern signal which is output from the character generator 28 is added to a readout signal from the image memory 24 by an adder 30. An output of the adder 30 is supplied to a TV signal processing circuit 32, by which it is converted into a television signal and input to a monitor 34. As shown in FIG. 2, twenty-five reduced images are simultaneously displayed on the screen of the monitor 34. A numerical value shown at the right lower position in each reduced image denotes a corresponding track number of the disc 12. As a method of displaying the track numbers, a pattern of the track number can be also written at the corresponding position in the image memory 24 without using the character generator 28. The character generator 28 also generates a signal to display a cursor 50 in FIG. 2.

In the confirmation mode, after the necessary reduced image data were stored in the image memory 24, the data stored in the image memory 24 are repetitively read out and displayed on the monitor 34 until the operating mode is set to the designated image reproduction mode. When the designated image reproduction mode is set by the operation of the keyboard 36, the switch 20 is connected to a contact 20b and the reproduced images (field reproduction or frame reproduction) are displayed on the whole screen of the monitor 34.

As mentioned above, the keyboard 36 has operation switches to give various kinds of indications to designate the operation mode of the CPU 12, a reproducing image, and the like to the CPU 12. FIG. 4 shows the details of the keyboard 36. Reference numeral 40 denotes up, down, right, and left shift keys to change the position of the cursor 50 displayed on the monitor screen as shown in FIG. 2. The cursor on the screen is controlled by the CPU 10 so as to be displayed on the screen by the character generator 28. A ten-key pad 41 is provided to designate the number of the track to be reproduced. Reference numeral 43 denotes an EXE (execution) key for setting the reproducing order of the images pointed out by the ten-key pad 41 or shift keys 40 in a program designation mode, which will be explained hereinlater, and for reproducing the images in accordance with the order set in this designation mode.

Reference numeral 45 denotes a key to designate the confirmation mode and 47 indicates a key to designate the designation screen reproduction mode. In the designation screen reproduction mode set by the key 47, the image on the track of the number designated by the ten-key pad 41 is displayed on the monitor 34. A program designation mode key 49 is used to set a program designation mode, which will be explained hereinlater. A designation end (END) key 51 is used to indicate the completion of the designation in the program designation mode. An OK key 53 is used for checking the reproducing order designated in the program designation mode and for inputting the result of the discrimination about whether the reproducing order is OK or not. A next screen key 55 is used to display the next screen. In FIG. 1, a RAM 58 stores a processing procedure which is set as will be explained hereinlater. The recorded addresses in the screen on which processes were set are stored in the RAM 58.

In the foregoing embodiment, the 25 images recorded on the disc 12 have simultaneously been displayed on the monitor 34. However, it is also possible to divide the recorded image into a plurality of groups and to display them on the monitor 34 different groups.

A procedure to realize the designation screen reproduction mode of the program system will now be described. FIG. 3 shows a flowchart for this procedure. This procedure is started by turning on a power source or the like. When the program designation mode is set by the key 49, the confirmation mode is first executed. The recorded images on the disc 12 are successively reduced by the reduction circuit 22 and stored into the image memory 24 while forwardly feeding the tracks. After the 25 field images were stored in the image memory 24, as shown in FIG. 2, the images are displayed together with the track numbers on the monitor 34 (step S1).

After step S1, a screen to be fully reproduced is designated by indicating the track number using the ten-key pad 41 on the keyboard 36 or by indicating the position at which the cursor is displayed on the screen. In this designating process, the track number of the desired image blinks for confirmation (step S2). A method of designating a desired screen is not limited to this method but, for instance, it may be preferable to display the track number or position in a special color. In the next step S3, the CPU 10 displays the numbers indicative of the reproducing order upon reproduction of the program of the image designated in this manner at a position, for instance, adjacent to the track number or the like. The processes in steps S2 and S3 are repeated until the designation of the reproduction image was completed (step S3).

When the END key 51 is depressed after completion of the designation of the reproduction image, the processing routine advances from step S4 to step S5. The recorded images on the disc 12 are again reproduced in accordance with the reproducing order and reduced by the reduction circuit 22 and stored in the image memory 24 (step S5). That is, the displayed images are rearranged in accordance with the program reproducing order set. If this reproducing order is OK, the operator depresses the OK key 53, so that the processing routine advances to the program reproduction mode (steps S6 and S7). The designated images are sequentially displayed on the monitor 34 in full size in accordance with the reproducing order. Namely, at this time, the switch 20 is switched to the contact 20b. In this case, the reproduction images can be automatically switched at a predetermined interval or may be switched by the operation of the next screen key 55 of the keyboard 36. If the reproducing order is wrong in step S6, the processing routine is returned to step S2 and the designating process is again executed.

In the case of the manual reproduction mode, a reproducing head is moved to the track of the designated image after steps S1 and S2 and the recorded image is reproduced in full size (namely, by connecting the switch 20 to the contact 20b). After the image is observed, the processes in steps S1 and S2 are again executed.

On the other hand, a disc detector 36 to detect the presence or absence of the disc 12 may be also provided. The presence or absence of the disc 12 is detected by the detector 36. Each time the disc 12 is inserted into the disc driver, the confirmation mode is set, that is, the display of the multi-screen shown in step S1 is performed. With this method, the content of the disc 12 can be easily checked and it is very convenient. The disc detector 36 comprises two photo couplers 36A and 36B and detects the presence or absence of the disc 12 on the basis of outputs of these photo couplers.

In the case of reproducing the reproduced images on the disc 12 in full size, the image memory 24 can be also by-passed, in other words, the output of the frequency demodulator 18 can be directly supplied to the adder 30 or TV signal processing circuit 32.

On the other hand, although a disc-shaped recording medium has been used in this embodiment, a tape-shaped recording medium or a semiconductor memory can be also used as the recording medium of the invention. On the other hand, although the image memory 24 has been used to supply a plurality of images to the monitor, the invention is not limited to this memory but a plurality of images can be also supplied from the recording medium to the monitor by using multi-heads. The ten-key pad or shift keys and the EXE key shown in FIG. 4 have been used as the setting means for the program reproduction. However, another switching means, e.g., a light pen to detect a bright point on the monitor screen can be also used. In this embodiment, a plurality of images on the monitor screen have been rearranged to display the setting state by the setting means. However, the setting state can be also displayed by using numerals or the like.

As will be easily understood from the above description, according to the embodiment, the content of the images recorded on a recording medium can be simultaneously confirmed, like a list and the reproducing order can be further checked, so that it is practically very useful.

In the foregoing embodiment, a plurality of images have been combined to thereby form a single screen called a multi-screen as shown in FIG. 2. An explanation will now be made with respect to an embodiment such that a desired small screen can be easily designated among a plurality of smaller screens making up such a multi-screen.

In the following embodiment, there is disclosed a reproducing apparatus which can easily select four desired small screens by providing switches corresponding to a plurality of small screens making up the multi-screen, respectively.

This embodiment will now be described hereinbelow with reference to FIGS. 5 to 7.

Figure 5:
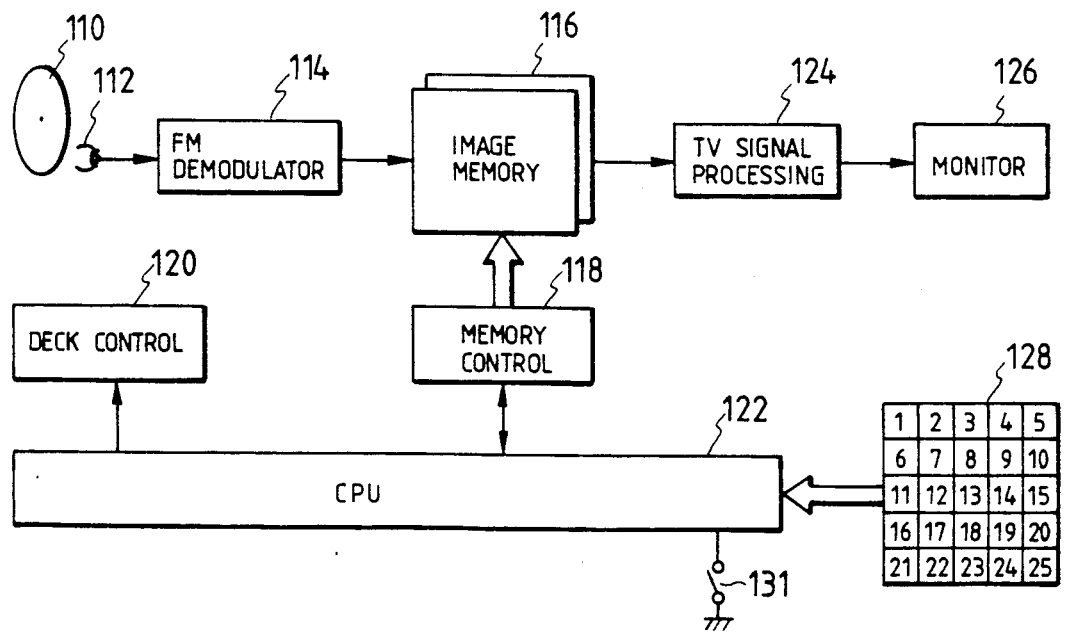
FIG. 5 is a block diagram showing an arrangement of a second embodiment of the invention.

FIG. 5 shows a schematic block diagram of the second embodiment of the invention. A still video disc 110 has fifty recording tracks. An image signal of one field can be recorded on each of the recording tracks. Reference numeral 112 denotes a reproducing head. A reproduction signal from the reproducing head 112 is frequency demodulated by a frequency demodulator 114. An image memory 116 has a memory of a memory capacity of one frame (i.e., two fields). With a construction which will be explained hereinlater, twenty-five recorded images are read out of the disc 110 and reduced and stored in a first field portion in the memory, and the remaining twenty-five recorded images are likewise reduced and stored in a second field portion. Reference numeral 118 denotes a memory control circuit; 120 is a deck control circuit; and 122 is a CPU to control the memory control circuit 118 and deck control circuit 120. A signal read out of the image memory 116 is converted into a television signal by a TV signal processing circuit 124 and supplied to a TV monitor 126 and displayed as an image. In the case of the reduction display mode, a total of 25 (=5×5) images are simultaneously displayed. In the ordinary reproduction mode, the image of an ordinary size is displayed.

Reference numeral 128 denotes a selecting apparatus consisting of 25 (=5×5) image selecting switches to select which one of the 25 (5×5) reduced small images displayed on the multi-screen on the monitor screen is to be reproduced and displayed. For example, as shown in FIG. 7B, the image selecting switches of the selecting apparatus 128 are arranged in a matrix for on a surface operation panel 129 of the reproducing apparatus in correspondence to the multi-screen display. FIG. 7A shows a display screen for the reduction multi-screen display. As the selecting apparatus 128, it is possible to use what is called a touch panel which is attached to the display surface of the monitor 126 or it may be also attached to a remote controller.

Figure 6:
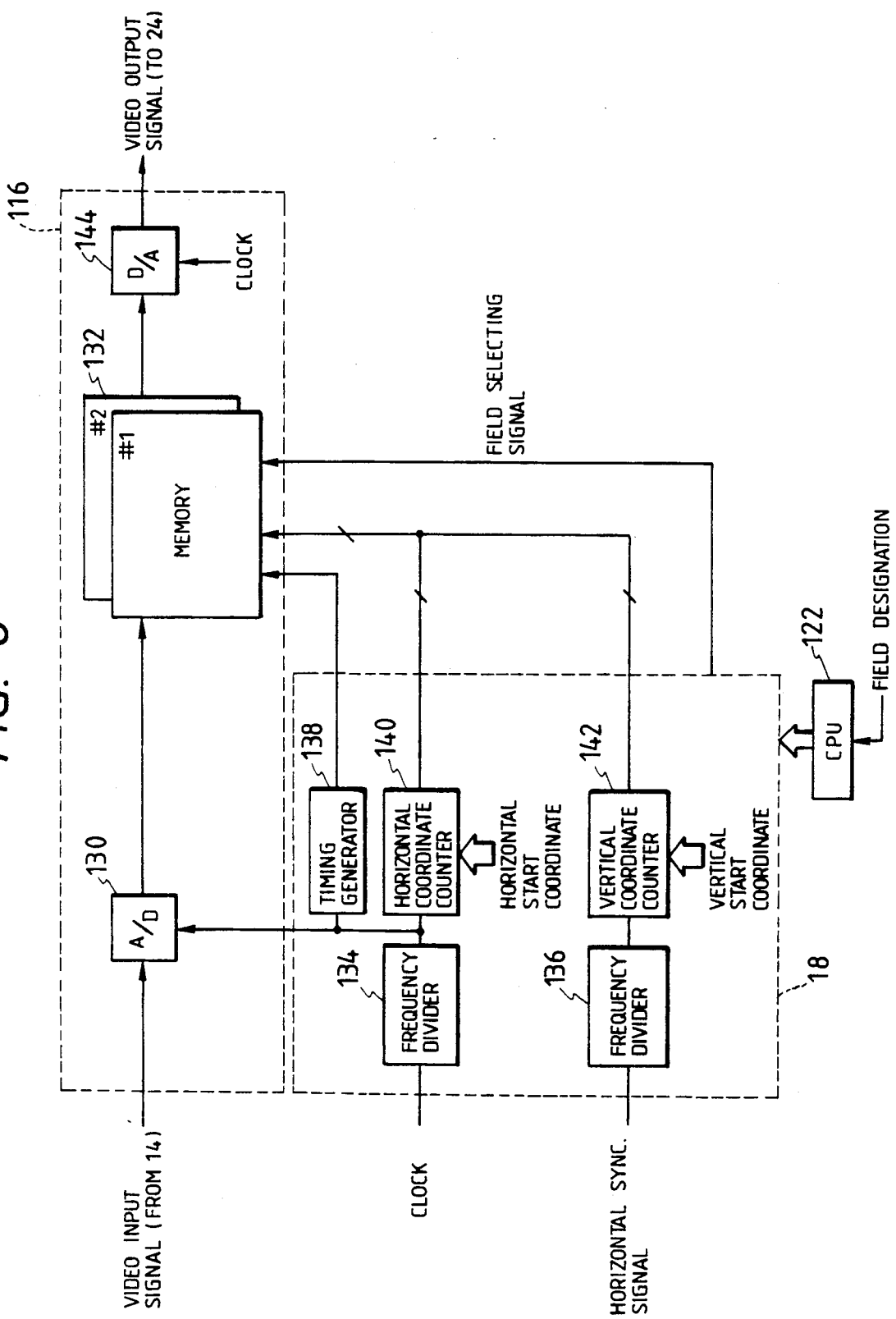
FIG. 6 is a block diagram showing an arrangement when a reproduction signal is written into a memory.

FIG. 6 shows a practical example of the memory control circuit 118 used to reduce and store a multi-screen in the image memory 116. A video signal which was frequency demodulated by the frequency demodulator 114 is sampled and converted in a digital signal by an A/D converter 130 and stored in a memory 132. The memory 132 has a memory capacity of two fields. Addresses to be actually stored in the memory 132 are controlled by the memory control circuit 118. The CPU 122 supplies to the memory control circuit 118 a signal to designate a reduction ratio for storage of a multi-screen and storage addresses (horizontal start coordinates and vertical start coordinates) in the memory 132 and a selection signal to select either one of the first and second field portions.

A clock formed from a reproduction signal is frequency divided by a frequency divider 143. A horizontal sync signal in the reproduction signal is frequency divided by a frequency divider 136. An output of the frequency divider 134 is supplied to the A/D converter 130, a timing generator 138, and a horizontal coordinate counter 140. An output of the frequency divider 136 is supplied to a vertical coordinate counter 142. At the initial stage of the reproduction of each recorded screen, the horizontal start coordinates are preset in the horizontal coordinate counter 140 and the vertical start coordinates are preset in the vertical coordinate counter 142. An output of the timing generator 138 specifies a timing when the memory 132 takes in an output of the A/D converter 130. Outputs of the horizontal and vertical coordinate counters 140 and 142 specify horizontal and vertical addresses in the memory 132, respectively.

After one arbitrary screen was reduced and stored in the memory 132, the CPU 122 moves the reproducing head 112 to another track on the disc 110 using the deck control circuit 120, and reproduces the recorded information from this track. Before the reproduction signal is stored in the memory 132, the horizontal and vertical start coordinates corresponding to the horizontal and vertical coordinates counters 138 and 142 are loaded, and the reduction storage in the memory 132 is performed. By repetitively performing the movement of the track and the updating of the storage coordinates, the 25 (=5×5) screens are reduction stored in the first field portion in the memory 132. The other 25 (=5×5) screens are reduction stored in the second field portion in the memory 132.

For example, when the images stored in the first field portion are displayed and monitored, the signal of the first field in the memory 132 is read out of the coordinates (0, 0) in an ordinary manner. The readout signal is converted into the analog signal by a D/A converter 144 and supplied to the TV signal processing circuit 124. Thus, 25 reduced small screens are simultaneously displayed on the TV (television) monitor. A designation with respect to whether the first field portion in the memory 132 is displayed or the second field portion is displayed depends on a field selecting signal which is supplied from the memory control circuit 118 to the memory 132. For instance, it is sufficient that the storage signal of the different field portion be displayed every time a switching signal of the switch is input to the CPU 122.

In the still video system, fifty field images can be recorded on a still video disc. Therefore, 25 images are reduced and stored in the respective fields in the image memory having the memory capacity of two fields and all of the total 50 images are stored in this image memory. Due to this, all of the recorded images on the disc can be immediately searched and checked by selecting the field to be displayed (for example, by switching a switch 131 shown in FIG. 5). By turning on the switch 131, the image of the first field portion is displayed on the monitor 126. By turning off the switch 131, the image of the second field portion is displayed on the monitor 126.

In this manner, a plurality of reduced images are stored in the image memory 116 and displayed on the monitor 126. Thereafter, a reproduction image is designated by the selecting apparatus 128. On the other hand, if there is no desired image in the first multi-screen display, the second field is selected and the reproduction image is designated by the selecting apparatus 128. That is, an image to be reproduced can be selected and designated without knowledge of the recording track. When inputting the reproducing order data for the direct access program reproduction or the like, a reproduction image can be directly designated while checking the images, so that it can be promptly designated without performing an erroneous operation.

When the recorded images on the disc 110 are reproduced, the memory 132 can be also commonly used as an image memory which is ordinarily used for correction of a time base or compensation of the signal dropout, or the like. The image memory 132 can be also used as a special memory to display a multi-screen for searching. In the former case, the memory content of the memory 132 is lost due to the designation of the reproduction screen by the selecting apparatus 128. Therefore, when the ordinary reproducing operation is finished or when the multi-screen display is designated, the recorded images on the disc 110 are again reduced and stored in the memory 132. In the latter case, in the ordinary reproducing mode, the memory 132 is disconnected from the reproduction processing system and after completion of the reproduction or the searching mode is designated, the memory 132 is connected to the display system. Or, when the disc 10 is exchanged, the images are reduced and stored and are again displayed as a multi screen on the monitor 126.

Although the foregoing embodiment has been explained as an example with respect to the case of recording a still image onto a disc-shaped recording medium, the invention can be also applied to the case of recording a still image onto a tape-shaped recording medium or to a reproducing system in which animation images are recorded onto a tape-shaped recording medium and reduced and displayed to search and designate a representative image.

As will be easily understood from the above description, according to the embodiment, a desired image can be designated by merely performing the switching operation in correspondence to the reduction display screen. Therefore, a situation such as an erroneous input of the track number does not occur. Since it is not always necessary to display the track numbers, the narrow display area can be used to display useful data.

On the other hand, according to the embodiment, among the field video signals of 50 screens recorded on 50 recording tracks on the still video disc, the video signals of 25 screens are written into the memory for the first field and the video signals of the remaining 25 screens are written into the memory for the second field. Further, the first and second fields can be switched by the simple operation. Therefore, all of the image information recorded on the disc can be immediately observed and checked.

As will be easily understood from the above description, according to the embodiment, for instance, the recorded images on the image recording medium can be immediately checked by only a switching operation of the switch, so that it is practically very useful. In the reproduction processing system of the video signal, a frame memory is used. By separately using the frame memory for the first field portion and for the second field portion, the invention can be realized without increasing the number of memory devices. Thus, the manufacturing cost is not raised by the embodiment.

An explanation will now be made with reference to FIG. 8 and subsequent drawings with respect to an apparatus which can perform an erasing operation in a state in which a plurality of recorded images are simultaneously observed by a monitor.

In the following embodiment, there is disclosed an apparatus comprising: reproducing means for reproducing recorded images on a recording medium; an image memory for reducing and storing a plurality of reproduction images reproduced by the reproducing means; designating means for designating an image to be erased from a multi-screen which is read out of the image memory; and erasing means for erasing the image designated by the designating means, wherein a plurality of recorded images can be simultaneously checked on a monitor by the image memory, so that the recording and erasing processes can be promptly and certainly executed and the operability is improved.

Such an embodiment of the invention will now be described hereinbelow with reference to the drawings. FIG. 8 shows a schematic block diagram of the embodiment in the case where the invention is applied to a still video recording/reproducing apparatus.

In FIG. 8, reference numeral 210 denotes a magnetic sheet; 212 is a motor; 214 a magnetic head; 216 a signal processing circuit; 218 an A/D converter; 220 a D/A converter; 222 an adder; 223 a video signal output terminal; 224 and 226 frequency dividers each having a frequency dividing ratio of 1/5; 228 an image memory having a memory capacity of one frame; 230 a horizontal address counter to specify a horizontal address in the image memory 228; 232 a vertical address counter to specify a vertical address in the image memory 228; 234, 236, 238, 240, and 242 change-over switches; 244 a controller; 245 an input terminal of an indicating signal or the like to the controller 224; 246 a memory; 248 a character generator to generate a character pattern; and 250 an erase signal generator.

Reference numeral 252 denotes a clock CLK; 254 is a horizontal sync signal HD; 256 a vertical sync signal VD; 258, 260, and 262 switching control signals of the change-over switches 234, 236, 238, 240, and 242; 264 a control signal to the signal processing circuit 216 and erase signal generator 250; 266 a head position control signal; 270 a read/write control signal of the image memory 228; and 272 a display control signal.

A multi-screen such that a plurality of reproduction images are displayed on one screen will now be described. The number of small screens comprising a multi-screen can be set to an arbitrary value. In this embodiment, similarly to the foregoing embodiment, the recorded images on the first to 25th tracks of the magnetic sheet 210 are written in the first field in the image memory 228 and the recorded images on the 26th to 50th tracks are written in the second field so as to enable the still video recording/reproducing system to be easily used. Namely, when the multi-screen display is designated to the controller 244, the magnetic head 214 is moved to the position of the first track by the head position control signal 266, thereby allowing the recorded image on the first track to be reproduced. The reproduction signal is subjected to well-known signal processes by the signal processing circuit 216. At the same time, the switches 234 and 236 are connected to the frequency dividers 224 and 226 by the switching control signal 258. Thus, the clock of the low frequency which is 1/5 of the frequency in the ordinary state is input to the A/D converter 218, horizontal address counter 230, and vertical address counter 232. The reproduction image is written at the corresponding position in the image memory 228 so as to match with one screen in FIG. 9.

By repeating the foregoing operations successively until the 50th track, namely, with regard to all of the tracks while forwardly feeding the magnetic head 214, the recorded images on the magnetic sheet 210 are stored in the image memory 228 as image arrangement patterns shown in FIG. 9. At this time, each reproduction image is numbered and the image information (for instance, the track number recorded, ID information in the case of the still video system, and the like) are stored in the memory 246. On the other hand, in the case where the multi-screens of the first and second fields in the image memory 228 are displayed on a monitor (not shown) connected to the output terminal 223, the corresponding number may be generated from the character generator 248 for each component image and this number is superposed on the image and displayed.

The erasing operation is executed in accordance with the following procedure. FIG. 10 shows a flowchart for this procedure. When an image to be erased is found on the multi-screen displayed on the monitor, the number to specify this image is input from a control unit 275 to the controller 244 through the input terminal 245 (step S102). The controller 244 reads out the corresponding image data from the memory 246 to thereby know the track number (step S104). The switches 240 and 242 are connected to the side so as to by-pass the image memory 228 by the switching control signal 262. The recorded image of this track number is reproduced for the purpose of confirmation and output to the monitor from the output terminal 223 and the whole screen is displayed (step S106). An operator observes the reproduction screen to thereby determine whether the erasing operation can be performed or not (step S108). An indication to erase is supplied from the input terminal 245 to the controller 244. In accordance with this erasing indication, the switch 238 is connected to the erase signal generator 250. The generator 250 then gives an erasing current to the magnetic head 214 in response to the control signal from the controller 244, thereby erasing (step S110). Thereafter, the data portion at the corresponding position in the erased image in the image memory 228 is muted or changed to other data (step S112). The switches 240 and 242 are returned to the original positions and the multi-screen display is again executed (step S114).

In this case, as a method of designating an image from the multi-screen, as shown in FIG. 2, there is used a method whereby the number which is superposed to each image or is displayed at the position near the image is input to the controller 244. However, as the designating method itself, other various kinds of methods can be used. For instance, as shown in FIG. 4, a method whereby the up, down, right, and left shift keys are used or the like can be used.

Figure 11:
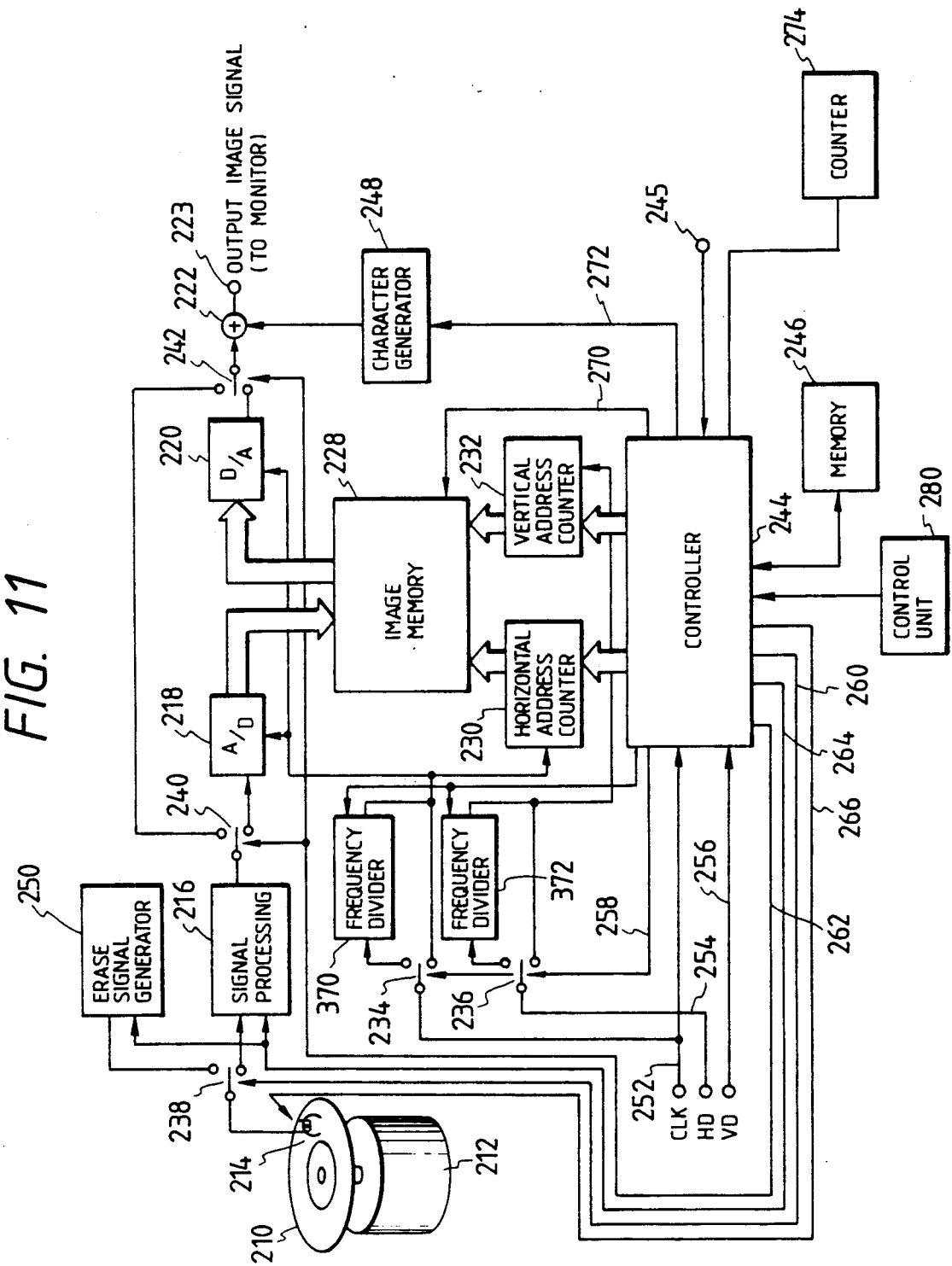
FIG. 11 is a block diagram of another embodiment.

In the embodiment of FIG. 8, the frequency dividers 224 and 226, each having a fixed frequency dividing ratio, have been used and the recorded images on all of the tracks of the magnetic sheet 210 have been reduced and stored in the image memory 228. However, the recorded images on several special tracks can be also reduced on the basis of the reduction ratio according to the number of images on these special tracks and stored into the image memory 228. FIG. 11 shows an example of the modification. In FIG. 11, variable frequency dividers 370 and 372, whose frequency dividing ratios can be changed by the controller 244, are used in place of the frequency dividers 224 and 226. In order to erase, a counter 274 is provided to count the number of track numbers which are initially input to the controller 244. The frequency dividing ratios of the variable frequency dividers are determined in accordance with the count value of the counter 274.

Figure 12:
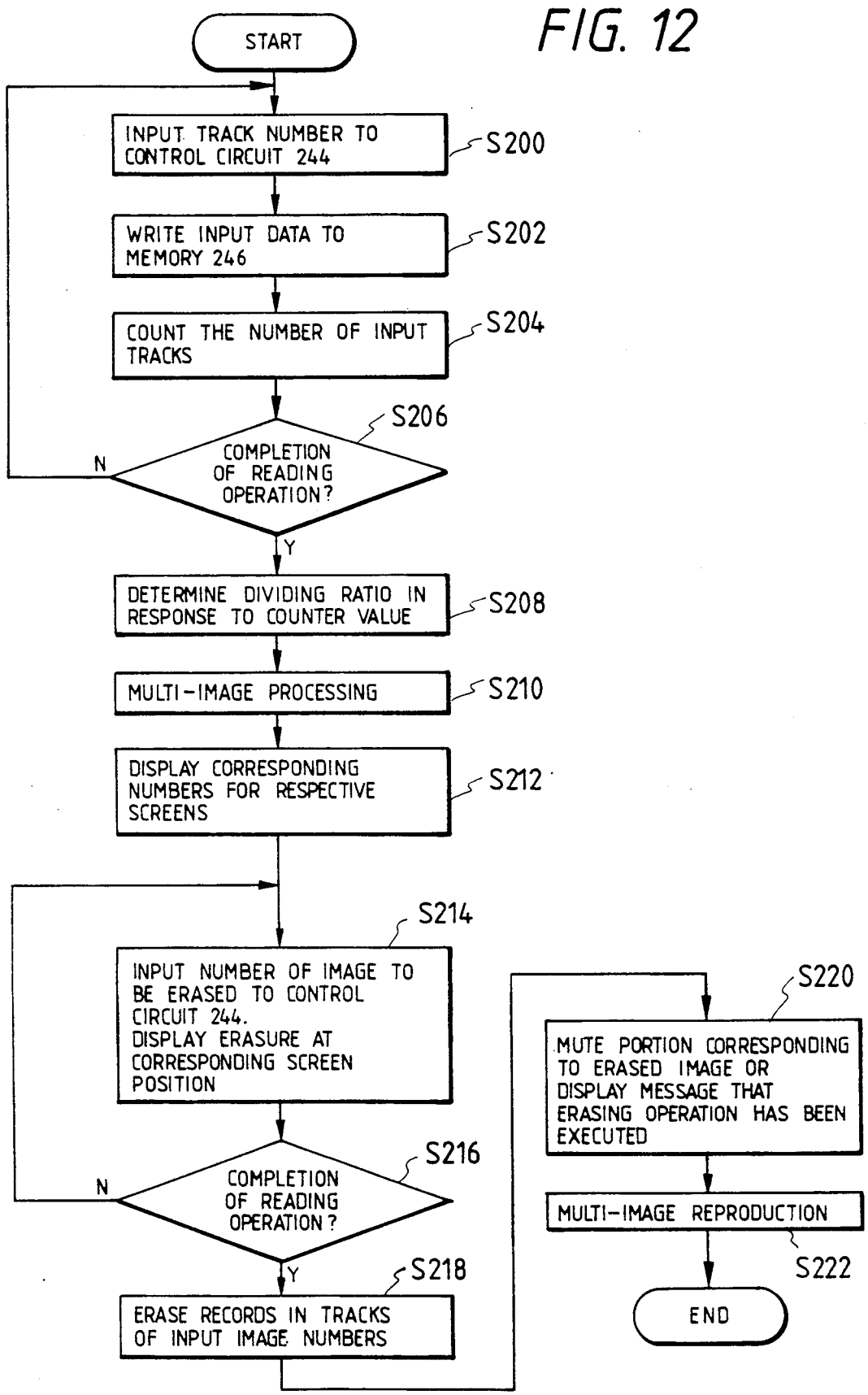
FIG. 12 is a flowchart for the erasing operation in FIG. 11.

FIG. 12 shows a flowchart for the circuit of FIG. 11. First, one or a plurality of track numbers for the purpose of erasing are input to the controller 244 and stored in the memory 246 sequentially in accordance with the inputting order, and the number of track numbers input is counted by the counter 274 (steps S200 to S204). When a signal indicative of the completion of the designation of the track is input to the controller 244, the controller 244 determines a frequency dividing ratio such that each image becomes the largest with reference to the content of the counter 274 (step S208). The recorded images on the designated tracks are sequentially reproduced in accordance with the inputting order and reduced on the basis of the decided frequency dividing ratio. The reduced images are successively stored in the image memory 228 and sequentially numbered. At the same time, the image data is newly written into the memory 246. After completion of the storage in the image memory 228, the multi-image is read out of the image memory 228 and output to the monitor from the output terminal 223 (step S210). At this time, the numbers corresponding to the respective component images are generated from the character generator 248 (step S212).

The operator observes the multi-screen and inputs one or a plurality of numbers to be erased to the controller 244. In a manner similar to the case of the embodiment of FIG. 8, the display of erase is added to the image portions corresponding to the input numbers in the image memory 228 (steps S214 and S216). After completion of the inputting operation, the images on the tracks of the designated numbers are erased (step S218). The portion corresponding to the erased image in the image memory 228 is muted or a message indicating that the erasing operation has been completed is displayed. Then, the multi-screen is again displayed (step S222). The foregoing processes can be also executed for every image to be erased.

When the images are displayed as a multi-screen, if an audio signal or data has been recorded on a predetermined track or if nothing is recorded on a certain track, it is desirable that a message corresponding to each of such cases is displayed at the corresponding position on the multi-screen or the muting operation or the like is performed. The useful information is stored in the memory 246.

As will be easily understood from the above description, according to this embodiment, in the case of erasing the unnecessary images from a recording medium onto which many image data are recorded, the images to be erased can be found out and erased very efficiently by these simple operations.

Figure 13:
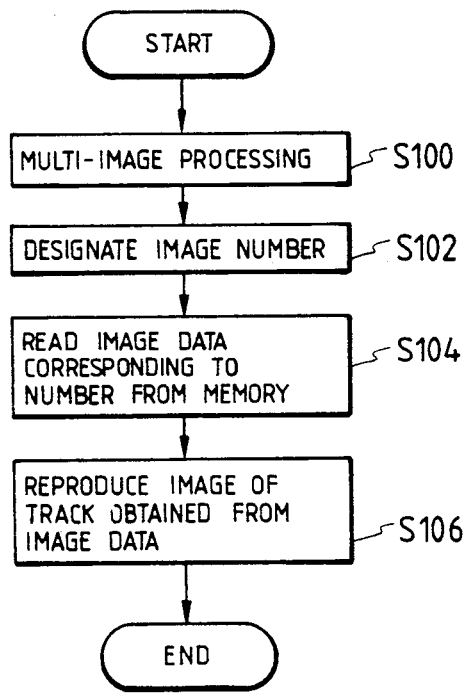
FIGS. 13 and 14 are diagrams showing modifications of the flowcharts shown in FIGS. 10 and 11.
Figure 14:
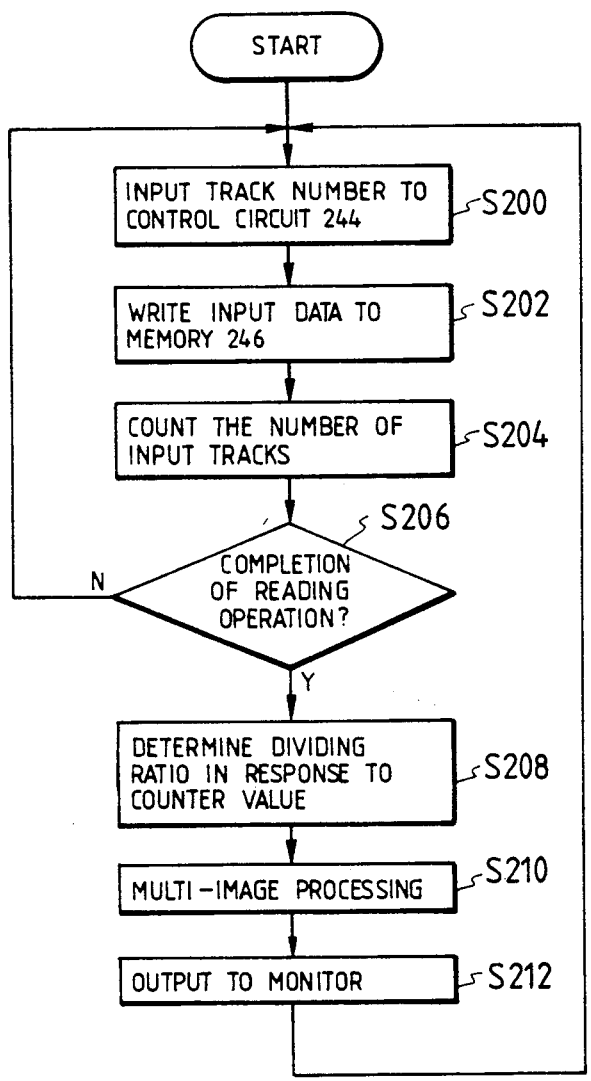

In the flowcharts shown in FIGS. 10 and 12, on the other hand, the description has been made including the erasing operation. However, the invention can be also applied to the case where the erasing operation is not performed as shown in flowcharts of FIGS. 13 and 14.

What is claimed is:

1. An image processing apparatus comprising:
   a) reproducing means for reproducing recorded image data from a medium on which a plurality of image data are recorded;
   b) mean for supplying to a monitor the reproduced image data as a multi-screen wherein one screen of the monitor displays a plurality of smaller screens each corresponding to a respective one of the plurality of image data;
   c) means for designating at least one of the smaller screens displayed on the multi-screen; and
   d) means for erasing from the medium image data corresponding to one of the smaller screens designated by the designating means.

2. An apparatus according to claim 1, further comprising:
   e) means for processing the image data recorded on the medium in accordance with a sequence of smaller screens designated by said designating means.

3. An apparatus according to claim 2, wherein said processing means comprises means for reproducing the image data recorded on the medium in the sequence of smaller screens designated by said designating means.

4. An apparatus according to claim 2, wherein said processing means comprises means for erasing the image data recorded on the medium in accordance with the sequence designated by said designating means.

5. An apparatus according to claim 1, further comprising a television monitor as the monitor.

6. An apparatus according to claim 1, wherein said medium is a disc-shaped medium as the medium on which the plurality of image data are stored.

7. An apparatus according to claim 1, wherein said designating means includes:
   means for selecting a desired one of said smaller screens which is displayed by said monitor in said multi-screen; and
   a memory to store data corresponding to the screen selected by said selecting means.

8. An apparatus according to claim 7, wherein the data corresponding to said selected screen is an address of the medium in which the image data of the selected screen is recorded.

9. An image processing apparatus comprising:
   a) reproducing means for reproducing recorded image data from a medium on which a plurality of image data are recorded;
   b) means for supplying to a monitor the reproduced image data as a multi-screen in which a plurality of smaller screens are simultaneously displayed, each smaller screen corresponding to a respective one of the plurality of reproduced image data; and
   c) means for designating one of the smaller screens whose image data is to be erased from the medium.

10. An apparatus according to claim 9, further comprising;
    d) means for erasing from the medium the image data of the designated smaller screen designated by said designating means.

11. An apparatus according to claim 9, wherein said designating means includes:
    a) means for selecting a desired one of said smaller screens which is displayed on the multi-screen;
    b) means for indicating that the selected screen is to be erased; and
    c) a memory for storing data corresponding to the screen indicated by said indicating means.

12. An apparatus according to claim 9, further comprising a television monitor as the monitor.

13. An apparatus according to claim 9, wherein said medium is a disc-shaped medium.

14. A reproducing apparatus for reproducing recorded image data from a medium on which the image data of a plurality of n screens are recorded, comprising:

a) means for outputting a plurality of multi-screens of image data, each multi-screen comprising a number n/m of the recorded screens, where n and m are integers and 1 <m<n; and means for providing the multi-screens to a monitor.

15. An apparatus according to claim 14, wherein said n=50.

16. An apparatus according to claim 15, wherein said medium is a still video disc-shaped medium.

17. An apparatus according to claim 15, wherein said outputting means arranges the image data of 25 screens into a matrix form of 5×5 and supplies a 5×5 multi-screen to the monitor.

18. An apparatus according to claim 14, wherein said outputting means includes:
a) a memory for storing the image data of one multi-screen;
b) means for writing the image data of the one multi-screen into said memory; and
c) means for reading out the image data of the multi-screen from said memory, and for supplying the read out image data to the monitor.

19. An apparatus for reproducing a plurality of images recorded on a recording medium, comprising:
a) means for displaying the plurality of images recorded on said recording medium as a multi-screen of n×m smaller screens, each smaller screen corresponding to a respective one of the plurality of recorded images, where n and m are integers;
b) selecting means comprising (n×m) selecting switches, each switch corresponding to one of said smaller screens, for selecting one of the smaller screens; and c) reproducing means for reproducing the image corresponding to the smaller screen selected by said selecting means.

20. A reproducing apparatus according to claim 19, wherein (n×m) is 5×5.

21. An image processing apparatus comprising:
a) reproducing means for reproducing recorded image data from a medium on which a plurality of image data are recorded;
b) means for supplying to a monitor the reproduced image data as a multi-screen in which a plurality of smaller screens are simultaneously displayed, each smaller screen corresponding to a respective one of the plurality of reproduced image data; and
c) means for designating one of the smaller screens whose image data is not to be further reproduced from the medium.

22. An apparatus according to claim 21, further comprising:
d) means for erasing from the medium the image data of the designated smaller screen designated by said designating means.

23. An apparatus according to claim 21, wherein said designating means includes:
means for selecting a desired one of said smaller screens which is displayed on the multi-screen;
means for indicating that the selected screen is to be erased; and
a memory for storing data corresponding to the screen indicated by said indicating means.

24. An apparatus according to claim 21, further comprising a television monitor as the monitor.

25. An apparatus according to claim 21, wherein said medium is a disc-shaped medium as the medium.

* * * * *

UNITED STATES PATENT AND TRADEMARK OFFICE
CERTIFICATE OF CORRECTION

PATENT NO. : 5,050,003

DATED : September 17, 1991

INVENTOR(S) : Hiroyuki Horii, et al.

It is certified that error appears in the above-identified patent and that said Letters Patent is hereby corrected as shown below:

ON THE COVER PAGE

UNDER U.S. PATENT DOCUMENTS

"4,763,208 8/1968" should read --4,763,208 8/1988--.

COLUMN 2

Line 32, "embodiment," should read --embodiment;--.

COLUMN 8

Line 22, "multi screen" should read --multi-screen--.

UNITED STATES PATENT AND TRADEMARK OFFICE
CERTIFICATE OF CORRECTION

PATENT NO. : 5,050,003

DATED : September 17, 1991

INVENTOR(S) : Hiroyuki Horii, et al.

It is certified that error appears in the above-identified patent and that said Letters Patent is hereby corrected as shown below:

COLUMN 11

Line 64, "mean" should read --means--.

COLUMN 12

Line 53, "claim 9." should read --claim 9,--.

Signed and Sealed this

Twenty-second Day of June, 1993

Attest:

MICHAEL K. KIRK

Attesting Officer — Acting Commissioner of Patents and Trademarks